United States Patent
Clar et al.

(10) Patent No.: US 10,325,511 B2
(45) Date of Patent: Jun. 18, 2019

(54) METHOD AND SYSTEM TO ATTRIBUTE METADATA TO PREEXISTING DOCUMENTS

(71) Applicant: Conduent Business Services LLC, Dallas, TX (US)

(72) Inventors: Megan Clar, Rochester, NY (US); Eric Michael Gross, Rochester, NY (US); Eric Harte, Rochester, NY (US); Dennis L. Venable, Marion, NY (US); Eric S. Hamby, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 114 days.

(21) Appl. No.: 14/609,820

(22) Filed: Jan. 30, 2015

(65) Prior Publication Data
US 2016/0224516 A1    Aug. 4, 2016

(51) Int. Cl.
*G06F 17/24* (2006.01)
*G09B 7/02* (2006.01)
(Continued)

(52) U.S. Cl.
CPC .............. *G09B 7/02* (2013.01); *G06F 17/211* (2013.01); *G06F 17/241* (2013.01); *G06K 9/18* (2013.01); *G06Q 10/10* (2013.01); *G09B 7/00* (2013.01); *G09B 7/06* (2013.01); *H04N 1/0044* (2013.01); *H04N 1/387* (2013.01); *H04N 2201/0094* (2013.01)

(58) Field of Classification Search
CPC ..... G09B 7/02; G09B 7/00; G09B 7/06; G06F 17/211; G06F 17/241; G06Q 10/10; G06K 9/18; H04N 1/0044; H04N 1/387; H04N 2201/0094
See application file for complete search history.

(56) References Cited

U.S. PATENT DOCUMENTS 6,178,308 B1 * 1/2001 Bobrow .................. G09B 5/00
                                                                   382/276
7,058,567 B2   6/2006 Ait-Mokhtar et al.
(Continued)

OTHER PUBLICATIONS

Misra et al., "A System for Automated Extraction of Metadata From Scanned Documents Using Layout Recognition and String Pattern Search Models", Archiving, 2009, 1509STP: 107-112, 17 pages.

*Primary Examiner* — Stephen S Hong
*Assistant Examiner* — Hope C Sheffield
(74) *Attorney, Agent, or Firm* — Fay Sharpe LLP (57) ABSTRACT

This disclosure provides a method and system to convert a first digital representation of a document including a first format to a second digital representation of the document including a second format. According to an exemplary method, a preexisting printed assessment is scanned to produce an image file and an educational assessment analysis system captures an image area associated with a question, processes the captured image area to automatically assign metadata associated with an independent assessment creation process to the captured image area, which is subsequently processed to generate an assessment based on the assigned metadata which conforms with a format consistent with the independent assessment creation process.

5 Claims, 11 Drawing Sheets

(51) Int. Cl.
*G06F 17/21* (2006.01)
*G09B 7/00* (2006.01)
*G06Q 10/10* (2012.01)
*G06K 9/18* (2006.01)
*G09B 7/06* (2006.01)
*H04N 1/00* (2006.01)
*H04N 1/387* (2006.01)

(56) References Cited

U.S. PATENT DOCUMENTS

| | | |
|---|---|---|
| 7,283,274 B2 | 10/2007 | Sharma |
| 7,689,037 B2 | 3/2010 | Handley et al. |
| 7,756,332 B2 | 7/2010 | Jager |
| 7,965,891 B2 | 6/2011 | Handley et al. |
| 8,457,544 B2 | 6/2013 | German et al. |
| 8,521,077 B2 | 8/2013 | Venable |
| 8,589,317 B2 * | 11/2013 | Paquet ................ G06N 99/005 706/12 |
| 8,699,939 B2 | 4/2014 | German et al. |
| 8,718,534 B2 | 5/2014 | Srinivas et al. |
| 8,725,059 B2 | 5/2014 | Lofthus et al. |
| 8,768,241 B2 | 7/2014 | Venable |
| 8,831,504 B2 | 9/2014 | German et al. |
| 2004/0117735 A1 * | 6/2004 | Breen ................ G06F 17/30905 715/202 |
| 2004/0121298 A1 | 6/2004 | Creamer et al. |
| 2005/0041860 A1 * | 2/2005 | Jager ................ G06K 9/00469 382/173 |
| 2009/0035733 A1 | 2/2009 | Meitar et al. |
| 2009/0068629 A1 | 3/2009 | Redd et al. |
| 2010/0075290 A1 | 3/2010 | DeYoung et al. |
| 2010/0075291 A1 * | 3/2010 | Deyoung ................ G09B 7/06 434/350 |
| 2010/0075292 A1 | 3/2010 | DeYoung et al. |
| 2010/0149606 A1 | 6/2010 | Handley et al. |
| 2010/0157345 A1 | 6/2010 | Lofthus et al. |
| 2010/0159432 A1 | 6/2010 | German et al. |
| 2010/0159437 A1 | 6/2010 | German et al. |
| 2010/0159438 A1 | 6/2010 | German et al. |
| 2010/0227306 A1 | 9/2010 | Lofthus et al. |
| 2011/0072340 A1 * | 3/2011 | Miller ................ G06F 17/246 715/220 |
| 2011/0103682 A1 * | 5/2011 | Chidlovskii ......... G06K 9/6284 382/159 |
| 2011/0123967 A1 | 5/2011 | Perronnin et al. |
| 2011/0151423 A1 | 6/2011 | Venable |
| 2011/0195389 A1 | 8/2011 | DeYoung et al. |
| 2012/0021398 A1 | 1/2012 | Venable |
| 2012/0189999 A1 * | 7/2012 | Uthman ................ G09B 7/02 434/335 |
| 2012/0310868 A1 * | 12/2012 | Martins ............ G06F 17/30616 706/12 |
| 2013/0052628 A1 | 2/2013 | Srinivas et al. |
| 2014/0064622 A1 | 3/2014 | Newell et al. |
| 2014/0065594 A1 | 3/2014 | Venable |
| 2014/0093858 A1 | 4/2014 | Caruthers, Jr. et al. |
| 2014/0234822 A1 | 8/2014 | Srinivas et al. |

* cited by examiner

| Layout | | | | | |
|---|---|---|---|---|---|
| Number of Columns | 1 ▼ | ☐ Frame | ☐ Preview | | |

Assessment Info

| | |
|---|---|
| Name | Assessment Model |
| Description | |
| Level | K ▼   Subject  ELA ▼ |
| Standards | |
| Skills | |
| Copyright | © 2013 Xerox |

Set ...

Questions

| | |
|---|---|
| Number | [            ] Points [  ] |
| Description | |
| Standards | |
| Skills | |

Set ...

Polina, the Polar Bear

When Polina told the whale her own story, he said, "I'm headed north anyway. You could ride on my back. We can look for your mother." Polina rode on Farswimmer's back. Sometimes, she also stood on his back and pretended she was surfing. It was a blast.

They took a break on the ice, not far from where Polina had fallen into the sea. They saw something in the sea. It was an unmoving animal! Farswimmer pushed the animal onto the ice. When he rolled it over, Polina saw a familiar face.

"Mommy," she yelped. Bearnice was very tired, but the sound of her cub's voice woke her up. She opened her arms and the two embraced each other in a big bear hug.

*Read each pair of sentences. Identify which detail is the cause and which detail is the effect. Write the correct capital letter.*

C=Cause   E=Effect

1. ☐ Bearnice went hunting for lunch.
   ☐ Polina was waiting for her mother.

2. ☐ Polina fell in the water.
   ☐ Polina was sitting on ice and it cracked.

3. ☐ Polina turned toward the water.
   ☐ Polina heard a deep voice.

4. ☐ Polina told Farswimmer about her mother.
   ☐ Farswimmer offers to take Polina on his back.

5. ☐ Farswimmer pushes the unmoving animal onto the ice.
   ☐ Farswimmer and Polina see an unmoving animal in the sea.

6. ☐ Bearnice heard Polina's voice.
   ☐ Bearnice woke up.

*Adopted from "The Perils of Polina"*
*http://education.usgs.gov/kid*

ELA - Cause and Effect 3.Aa

FIG. 8

Layout

Number of Columns [1 ▼] ☐ Frame ☐ Preview

Assessment Info

Name: Polina, the Polar Bear
Description: Cause and Effect
Level: 3 ▼  Subject: ELA ▼
Standards: RI.3.8  [Set...]
Skills: cause-and-effect
Copyright: © 2014 XEROX

Questions

Number: Q.01  Points: 1
Description: Hunting
Standards: RI.3.8  [Set...]
Skills: cause-and-effect Options  ☐ Require all keys correct for any credit

| Name | Value | Key | ICR | Border | Dictionary |
|---|---|---|---|---|---|
| 1.001 | C | ☑ | ☑ | ☑ | [Set...] |

Global Metadata

A. Refers to the description of the assessment

B. Refers to the Standards or Common Core Strand that the assessment and the assessment questions are referencing C. The title of the assessment

Question level Metadata

D. The question number

E. Description of question

F. Skill being assessed

G. Referencing subject area (ELA = English Language Arts). Some assessments may be mixed, both ELA and Math this field is adjustable at the question level as well.

---

(A) Cause and Effect 3.Aa
CCSS: RL.3.3, RI.3.3
Lexile 780

(B) Directions: Read the sentences and answer the questions that follow.

(C) Polina, the Polar Bear

Polina the Polar Bear sat on an ice floe in the Arctic Ocean. Polina was waiting for her mother, Bearnice, to return with a seal lunch. To hunt, Bearnice would wait for seals to come up for air through holes in the ice. Polar bears have always hunted this way. Now, though, there was a difference. More ice had melted last summer. This winter it hadn't refrozen as usual. Warmer weather was making the ocean warmer than anyone could remember. Bearnice had to swim farther every day to find a good hunting spot. As Polina waited for her mother, the ice shrank bit by bit. And one afternoon, it cracked.

Splash! The water was cold. Polina's blubbery body helped keep her floating. She drifted in the current until she washed up on a rocky beach. Polina then heard a deep voice coming When Polina told the whale her own story, he said, "I'm headed north anyway. You could ride on my back. We can look for your mother." Polina rode on Farswimmer's back. Sometimes, she also stood on his back and pretended she was surfing. It was a blast.

They took a break on the ice, not far from where Polina had fallen into the sea. They saw something in the sea. It was an unmoving animal! Farswimmer pushed the animal onto the ice. When he rolled it over, Polina saw a familiar face.

"Mommy," she yelped. Bearnice was very tired, but the sound of her cub's voice woke her up. She opened her arms and the two embraced each other in a big bear hug.

*Read each pair of sentences. Identify which detail is the cause and which detail is the effect. Write the correct capital letter.*

*C=Cause  E=Effect*

(E) 1. ☐ Bearnice went hunting for lunch.
☐ Polina was waiting for her mother.

(D) 2. ☐ Polina fell in the water.
☐ Polina was sitting on ice and it cracked.

3. ☐ Polina turned toward the water.
☐ Polina heard a deep voice.

4. ☐ Polina told Farswimmer about her mother.
☐ Farswimmer offers to take Polina on his back.

5. ☐ Farswimmer pushes the unmoving animal onto the ice.
☐ Farswimmer and Polina see an unmoving animal in the sea.

6. ☐ Bearnice heard Polina's voice.
☐ Bearnice woke up.

*Adapted from "The Perils of Polina"*
*http://edrosdon.usys.gov/dd*

(G) ELA - Cause and Effect 3.Aa (F)

METHOD AND SYSTEM TO ATTRIBUTE METADATA TO PREEXISTING DOCUMENTS

BACKGROUND

This disclosure relates to document processing methods and systems. According to an exemplary embodiment of this disclosure, a document processing method and system is provided which attributes metadata to isolated areas of a preexisting document, such as a student assessment, and subsequently processes the preexisting document and attributed metadata to generate a processed document which includes the content of the preexisting document formatted according to standards provided by another independent document creation process.

The present disclosure relates to the process of assessing the attributes of a student or group of students at selected times during their learning process and particularly relates to the assessment and evaluation of student attributes or progress in a structured classroom where a teacher is required to educate the students to a level of proficiency in various subject matters and at particular grade levels. Typically, in a grade level classroom, the teacher periodically gives the students printed form assessments or tests, as they have previously been referred to, in order to obtain an indication of the student(s) level(s) of proficiency in the subject matter of immediate interest.

U.S. Patent Publication No. 2010/0075290, published Mar. 25, 2010, by DeYoung et al., and entitled "AUTOMATIC EDUCATIONAL ASSESSMENT SERVICE" describes a system for automatically evaluating assessments of the type given by a teacher/educator for determining the state of learning or progress of students during the course of instructions; and, the system is applicable particularly in a classroom setting where the teacher is responsible for educating a relatively large group of students. The system and technique of the present disclosure enables the teacher/educator to select from the digital user interface (DUI) of a Multifunction Device (MFD) any of multiple predetermined stored assessment forms in a Data Warehouse/Repository of such assessment forms for administration to a teacher/educator selected group of one or more students.

The teacher then requests the system to create an Assessment Batch and to print out personalized versions of the assessment form, where each version is automatically bar coded for the individual student. The student's name is also printed on the form for the purpose of delivering each assessment to the appropriate student. If desired, the student's name may be printed on the reverse side of the form such as, for example in large print, such that the person administering the test can verify from a distance that each student has the correct form, and so that forms can be handed out individually without disclosing the content of the assessment.

Once the students have completed the assessment, or alternatively where the teacher/educator marks the assessment for students' oral response, the marked assessment forms are then scanned into the system at the MFD.

Based on the information bar coded on the scanned forms, the system then identifies the student and Assessment Batch. The system then employs the appropriate image analysis of the markings, and performs an evaluation of each item on each of the assessments based upon a pre-programmed rubric. The system then automatically stores a preliminary evaluation in the Data Warehouse/Repository for each student. The teacher/educator may then view the assessments at a remote terminal and validate/annotate them. The system then automatically updates the validated/annotated assessment records in the Data Warehouse/Repository (DW/R) for later retrieval in various report views, which may be retrieved at the MFD or remotely by the teacher or other authorized educator.

This disclosure and the exemplary embodiments provided herein address concerns of users of an Automatic Educational Assessment System as disclosed in U.S. Patent Publication No. 2010/0075290, published Mar. 25, 2010, by DeYoung et al., and entitled "AUTOMATIC EDUCATIONAL ASSESSMENT SERVICE", which include the desire to use preexisting assessments and curriculum.

INCORPORATION BY REFERENCE

U.S. Pat. No. 8,831,504, issued Sep. 9, 2014, by German et al., and entitled "SYSTEM AND METHOD FOR GENERATING INDIVIDUALIZED EDUCATIONAL PRACTICE WORKSHEETS";

U.S. Pat. No. 8,768,241, issued Jul. 1, 2014, by Venable, and entitled "SYSTEM AND METHOD FOR REPRESENTING DIGITAL ASSESSMENTS";

U.S. Pat. No. 8,725,059, issued May 13, 2014, by Lofthus et al, and entitled "SYSTEM AND METHOD FOR RECOMMENDING EDUCATIONAL RESOURCES";

U.S. Pat. No. 8,718,534, issued May 6, 2014, by Srinivas Sharath, and entitled "SYSTEM FOR CO-CLUSTERING OF STUDENT ASSESSMENT DATA";

U.S. Pat. No. 8,699,939, issued Apr. 15, 2014, by German et al., and entitled "SYSTEM AND METHOD FOR RECOMMENDING EDUCATIONAL RESOURCES";

U.S. Pat. No. 8,521,077, issued Aug. 27, 2013, by Venable, and entitled "SYSTEM AND METHOD FOR DETECTING UNAUTHORIZED COLLABORATION ON EDUCATIONAL ASSESSMENTS";

U.S. Pat. No. 8,457,544, issued Jun. 4, 2013, by German et al., and entitled "SYSTEM AND METHOD FOR RECOMMENDING EDUCATIONAL RESOURCES";

U.S. Pat. No. 7,965,891, issued Jun. 21, 2011, by Handley et al., and entitled "SYSTEM AND METHOD FOR IDENTIFYING AND LABELING FIELDS OF TEXT ASSOCIATED WITH SCANNED BUSINESS DOCUMENTS";

U.S. Pat. No. 7,756,332, issued Jul. 13, 2010, by Jager, and entitled "METADATA EXTRACTION FROM DESIGNATED DOCUMENT AREAS";

U.S. Pat. No. 7,689,037, issued Mar. 30, 2010, by Handley et al., and entitled "SYSTEM AND METHOD FOR IDENTIFYING AND LABELING FIELDS OF TEXT ASSOCIATED WITH SCANNED BUSINESS DOCUMENTS";

U.S. Pat. No. 7,058,567, issued Jun. 6, 2006, by Ait-Mokhtar et al., and entitled "NATURAL LANGUAGE PARSER";

U.S. Pat. No. 6,178,308, issued Jan. 23, 2001, by Bobrow et al., and entitled "PAPER-BASED INTERMEDIUM FOR PROVIDING INTERACTIVE EDUCATIONAL SERVICES";

U.S. Patent Publication No. 2014/0234822, published Aug. 21, 2014, by Srinivas et al., and entitled "SYSTEM FOR CO-CLUSTERING OF STUDENT ASSESSMENT DATA";

U.S. Patent Publication No. 2014/;0093858, published Apr. 3, 2014, by Caruthers, Jr. et al., and entitled "METHOD AND SYSTEM FOR EVALUATING ELECTRONIC DOCUMENT";

U.S. Patent Publication No. 2014/0065594, published Mar. 6, 2014, by Venable, and entitled "CREATING ASSESSMENT MODEL FOR EDUCATIONAL ASSESSMENT SYSTEM";

U.S. Patent Publication No. 2014/0064622, published Mar. 6, 2014, by Newell et al., and entitled "METHOD AND SYSTEM FOR EVALUATING HANDWRITTEN DOCUMENTS";

U.S. Patent Publication No. 2012/0189999, published Jul. 26, 2012, by Uthman et al., and entitled "SYSTEM AND METHOD FOR USING OPTICAL CHARACTER RECOGNITION TO EVALUATE STUDENT WORKSHEETS";

U.S. Patent Publication No. 2011/0195389, published Aug. 11, 2011, by DeYoung et al., and entitled "SYSTEM AND METHOD FOR TRACKING PROGRESSION THROUGH AN EDUCATIONAL CURRICULUM";

U.S. Patent Publication No. 2011/0151423, published Jun. 23, 2011, by Venable, and entitled "SYSTEM AND METHOD FOR REPRESENTING DIGITAL ASSESSMENTS";

U.S. Patent Publication No. 2011/0123967, published May 26, 2011, by Perronnin et al., and entitled "DIALOG SYSTEM FOR COMPREHENSION EVALUATION";

U.S. Patent Publication No. 2010/0157345, published Jun. 24, 2010, by Lofthus et al., and entitled "SYSTEM FOR AUTHORING EDUCATIONAL ASSESSMENTS";

U.S. Patent Publication No. 2010/0075292, published Mar. 25, 2010, by DeYoung et al., and entitled "AUTOMATIC EDUCATION ASSESSMENT SERVICE";

U.S. Patent Publication No. 2010/0075291, published Mar. 25, 2010, by DeYoung et al., and entitled "AUTOMATIC EDUCATIONAL ASSESSMENT SERVICE";

U.S. Patent Publication No. 2010/0075290, published Mar. 25, 2010, by DeYoung et al., and entitled "AUTOMATIC EDUCATIONAL ASSESSMENT SERVICE";

U.S. Patent Publication No. 2009/0035733, published Feb. 5, 2009, by Meitar et al., and entitled "DEVICE, SYSTEM, AND METHOD OF ADAPTIVE TEACHING AND LEARNING";

U.S. Patent Publication No. 2005/0041860, published Feb. 24, 2005, by Jager, and entitled "METADATA EXTRACTION FROM DESIGNATED DOCUMENT AREAS"; and Misra et al., "A SYSTEM FOR AUTOMATED EXTRACTION OF METADATA FROM SCANNED DOCUMENTS USING LAYOUT RECOGNITION AND STRING PATTERN SEARCH MODELS", Archiving, 2009, 1509STP: 107-112, 17 pages, are incorporated herein by reference in their entirety.

BRIEF DESCRIPTION

In one embodiment of this disclosure, described is a computer-implemented method of converting a first digital representation of a first form document including a first format to a second digital representation of the first form document including a second format, the method comprising: a) capturing a first area of the first digital representation of the form document, the first area selected by a user and the first area including one or more of a text, an image and a graphic; b) assigning metadata to the first area, the metadata including one or more predefined selectable metadata field entries associated with the first area, the predefined selectable metadata field entries defined by an associated independent document creation process configured to generate a second form document based on one of a plurality of predefined form document models including the second format and based on the user inputting the one or more predefined selectable metadata field entries; and c) the independent document creation process generating the second digital representation of the first form document including the second format based on the first area and the assigned metadata.

In another embodiment of this disclosure, described is an image processing system for converting a first digital representation of a first form document to a second digital representation of the first form document, the image processing system comprising: an image capture module which captures a first area of the first digital representation of the first form document, the first area selected by a user and the first area including one or more of a text, an image and a graphic; an assignor module which assigns metadata to the first area, the metadata including one or more predefined selectable metadata field entries associated with the first area, the predefined selectable metadata field entries defined by an associated independent document creation process configured to generate a second form document based on one of a plurality of predefined document models and the user inputting one or more predefined selectable metadata field entries; and an independent document creation module which generates the second digital representation of the first form document based on the first area and the assigned metadata.

In still another embodiment of this disclosure, described is a computer-implemented method of creating an assessment using an educational assessment analysis system including one or more questions to be answered by a student, the method comprising: a) the educational assessment analysis system acquiring a first digital representation of a preexisting assessment not created with the educational assessment analysis system; b) the educational assessment system capturing a first area of the first digital representation of the form document, the first area selected by a user of the educational assessment analysis system and the first area including one or more of a text, an image and a graphic associated with a question to be answered by a student; c) the educational assessment system assigning metadata to the first area, the metadata including one or more predefined selectable metadata field entries associated with the first area, the predefined selectable metadata field entries defined by an independent assessment creation process associated with the educational assessment analysis system, the independent assessment creation process configured to generate an assessment based on one of a plurality of predefined assessment models and the user inputting the one or more selectable metadata field entries; and d) the independent assessment creation process generating a second digital representation of the preexisting assessment based on the first area and the assigned metadata.

BRIEF DESCRIPTION OF THE DRAWINGS

FIG. 9 is an example of a first image area of the preexisting assessment illustrated in FIG. 8 captured via a screen shot, along with metadata completed fields, according to an exemplary embodiment of this disclosure.

FIG. 10 is an example of a second image area of the preexisting assessment illustrated in FIG. 8 captured via a screen shot along with metadata completed fields, according to an exemplary embodiment of this disclosure.

DETAILED DESCRIPTION

This disclosure provides a document information processing method and system that allows for a preexisting printed document to be scanned in, or by using electronic documents allows for metadata to be attributed to isolated areas of the preexisting document. The isolated areas can be printed text type or pictures, and the areas can be customizable to each area of the document. According to an exemplary embodiment, each isolated area is a cell or layer that can be assigned distinct metadata. The metadata that is assigned to the isolated areas can come from any electronic source, but for the sake of illustration, this approach is applied to meet a need of the Xerox Ignite program, and therefore the example described includes a source associated with a bank of educational standards. The metadata from the cell or layer can auto-populate based on OCR recognition of key words, i.e., highly populated words in the set, or can be entered manually. Each piece of metadata or cell or layer on a document can be linked or unlinked for reporting purposes. All metadata can be stored into a database, corresponding to the original document; data can be tabulated and reported based on the key words from the OCR data.

This disclosure provides a method and system to help teachers by providing a convenient way to import their existing assessments into an assessment creator/evaluator system such as Ignite and converting them to Ignite-friendly format or other assessment system format. Specifically, the disclosure provides a system that can capture a section of an electronic document, e.g., via mouse, and parse that section to identify text/figures and the format in terms of Multiple Choice Questions (MCQs), fill-in-the-blanks, etc.

The disclosed exemplary embodiments address a widespread concern that has been expressed by many educators who are first introduced to the Xerox Ignite Educator Support System, referred to below as "Ignite". The purpose of Ignite is to assist educators in their workflow. One example improvement is in the processing of student exams, referred to as assessments. Educators can create or use pre-created work from the Ignite assessment content, but the system does not easily allow educators to use materials that they have created prior and which they wish to continue using. Complicating matters is that pre-existing educator materials may come in variety of formats such as printed documents, PDF, and Microsoft Word Doc. Ignite currently only allows for assessments to be created in a proprietary system referred to here as the "assessment creator tool", so if the educator wants to use pre-existing content, then they would have to manually recreate the content within the proprietary assessment creator tool. This can be very time consuming and is a hindrance to the acceptance of Ignite by the educator community. The reason assessments need to be created in the Ignite System is for the purpose of assigning metadata. The robust reporting that is generated through Ignite pulls the metadata from each assessment to enable reporting that provides educators useful information to guide instruction at the class level as well as the individual student level. This disclosure describes a method and system that allows one to efficiently input pre-existing material and apply metadata to desired fields associated with the assessment creator/evaluator system. For the case of Xerox Ignite, the completed assessment is then scanned into Ignite for validation and the metadata from the questions populates into one or more of a variety of reports for use in an Ignite score book and report applications.

Figure 1:
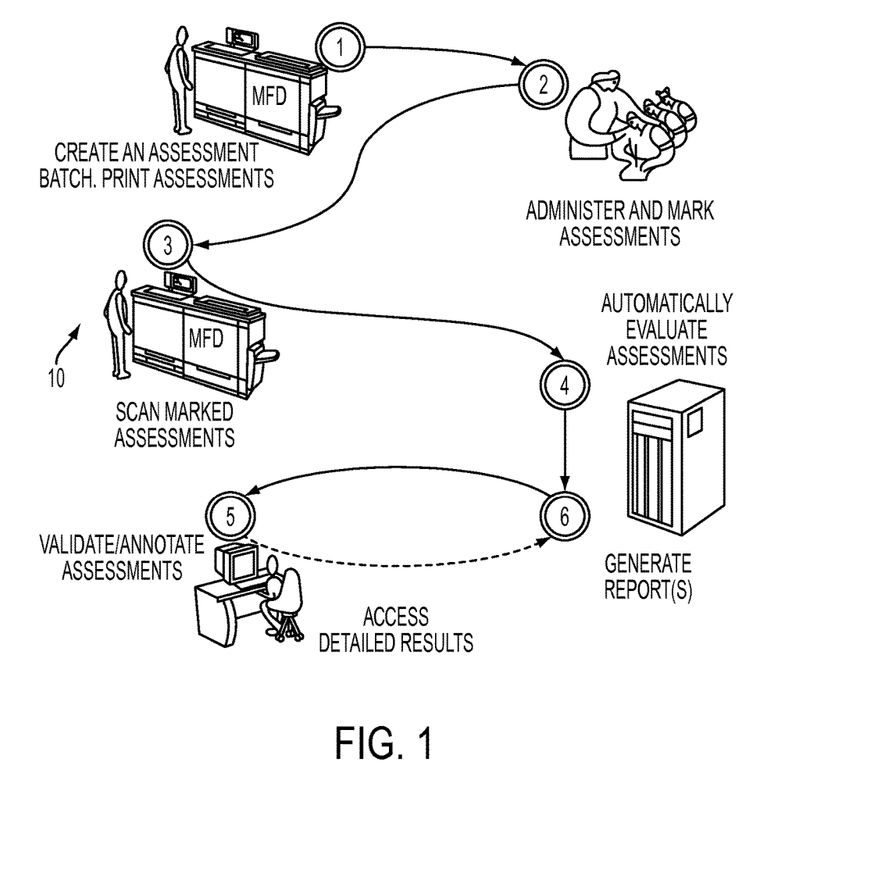
FIG. 1 is a pictorial diagram of a method to process preexisting assessments according to an exemplary embodiment of this disclosure.

Referring to FIG. 1, an overview of the functional operation of an assessment creation/evaluation system is illustrated wherein at station 1 the multifunctional device (MFD) is provided for the teacher/educator to input the information required regarding the assessment form and student or number of students desired to create an Assessment Batch; and, once the Assessment Batch has been created in the system by teacher/educator input at the DUI (digital user interface) of the MFD, the assessments may be also printed at the MFD or any remote printer connected thereto. In the present practice, an Assessment Batch includes the teacher's name and a student list which includes the names of the students to be included in the batch, the particular assessment form to be administered to the students in the student list and the creation date of the Assessment Batch.

At station 2 of the system indicated generally at 10 in FIG. 1, the teacher/educator administers the assessments which are marked. Depending on type of the assessment, the printed sheets may be marked by the teacher/educator or the students according to the nature of the assessment.

At station 3, the teacher/educator or their designated representative, scans the marked assessments into the system at the MFD. At station 4, the system automatically evaluates the assessments employing image analysis according to the established rubrics associated with the assessment form associated with the Assessment Batch and enables the teacher to access the evaluations at station 5 which is illustrated as a remote station such as a teacher's personal computer (PC). The teacher/educator validates/annotates the assessments and upon receipt of the validation, the system generates reports at station 6 which may be accessed and viewed at either the MFD or the teacher's personal computer terminal remote from the MFD.

Figure 2:
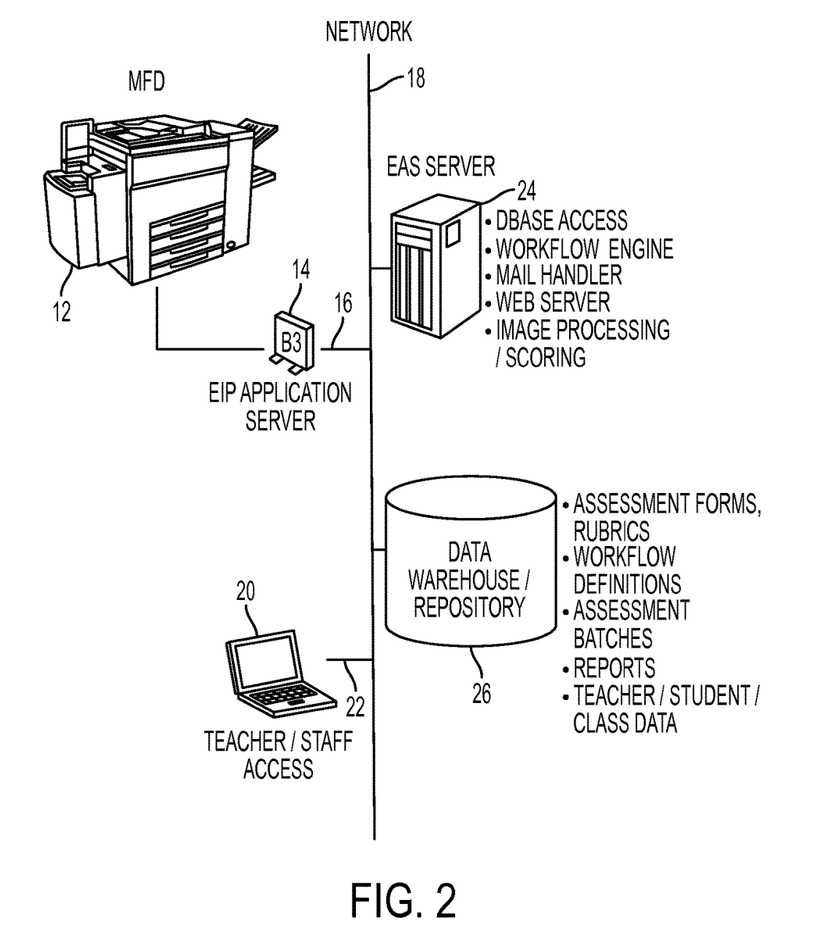
FIG. 2 is a diagram of a system to process preexisting assessments according to an exemplary embodiment of this disclosure.

Referring to FIG. 2, the overall architecture of the system employed with the presently disclosed method is illustrated pictorially with the MFD 12 connected through an application server 14 along line 16 to a network 18 which may be either a local or wide area network and may include connections to the internet. A remote terminal or PC 20 such as a teacher/educator access terminal is connected along line 22 to the network 18. A system server 24 is also connected to the network 18 and provides the functions of database access, serves as a workflow engine, mail handler, web server and functions of image processing/scoring.

A Data Warehouse/Repository 26 is also connected to the network and contains such items as assessment forms and associated rubrics, workflow definitions, Assessment Batch records, reports and teacher/student/class data and is operable to receive updates and to provide for access to data stored therein remotely therefrom over network 18.

As mentioned hereinabove, the system and method of the present disclosure function to assist a teacher/educator by providing automatic evaluation of assessments administered to students based upon established rubrics programmed into the system and employing image analysis. The system and method of the present disclosure have the capability to evaluate assessments which are marked with images other than by marking within a box or bubble with respect to multiple choice answers. The system has the ability to scan the marked assessment and lift the manually made marks made during the administering of the assessment from the preprinted markings on the assessment sheet. The system and method then employ image analysis to identify and evaluate the lifted marks. The method and system are capable of handling numerous types of assessment items employed by teachers/educators examples of which are illustrated in the present disclosure in FIGS. 8-22.

Various types of assessments may be administered to the students and may include summative, formative, diagnostic, interest, preference and benchmark assessments.

Figure 3A:
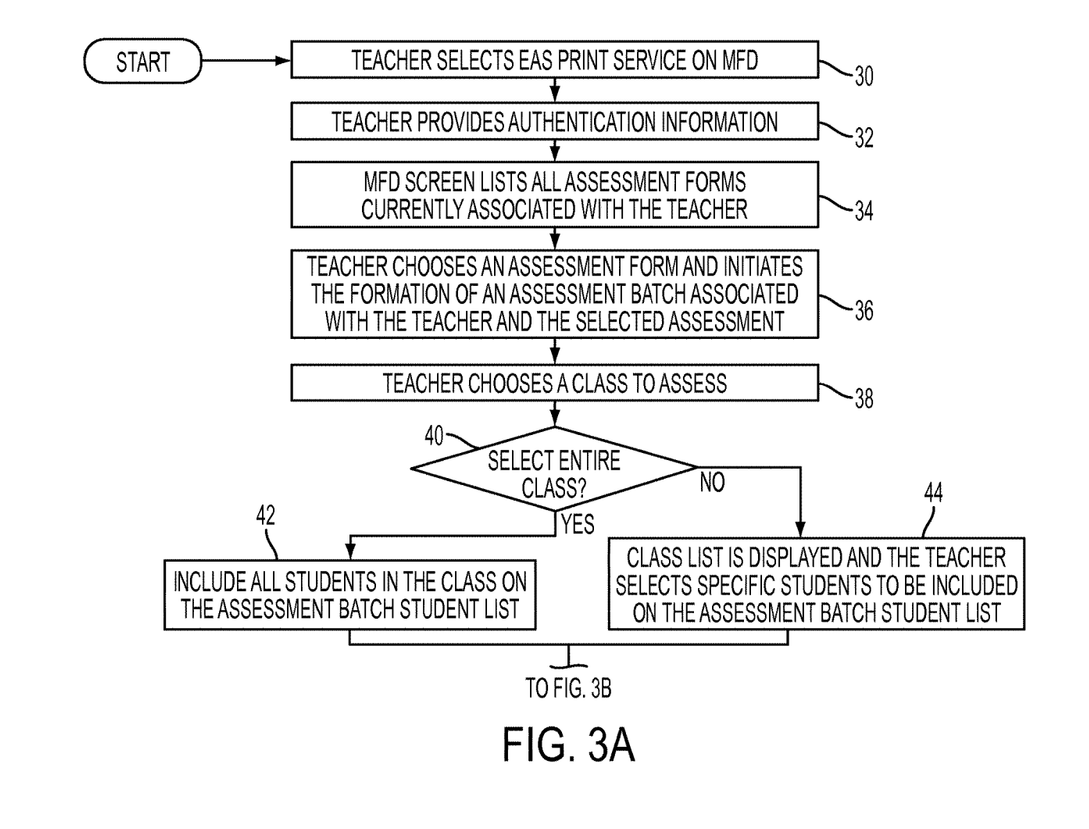
FIGS. 3A and 3B is a flow chart of a method to generate a printed assessment for manual marking by a student according to an exemplary embodiment of this disclosure.
Figure 3B:
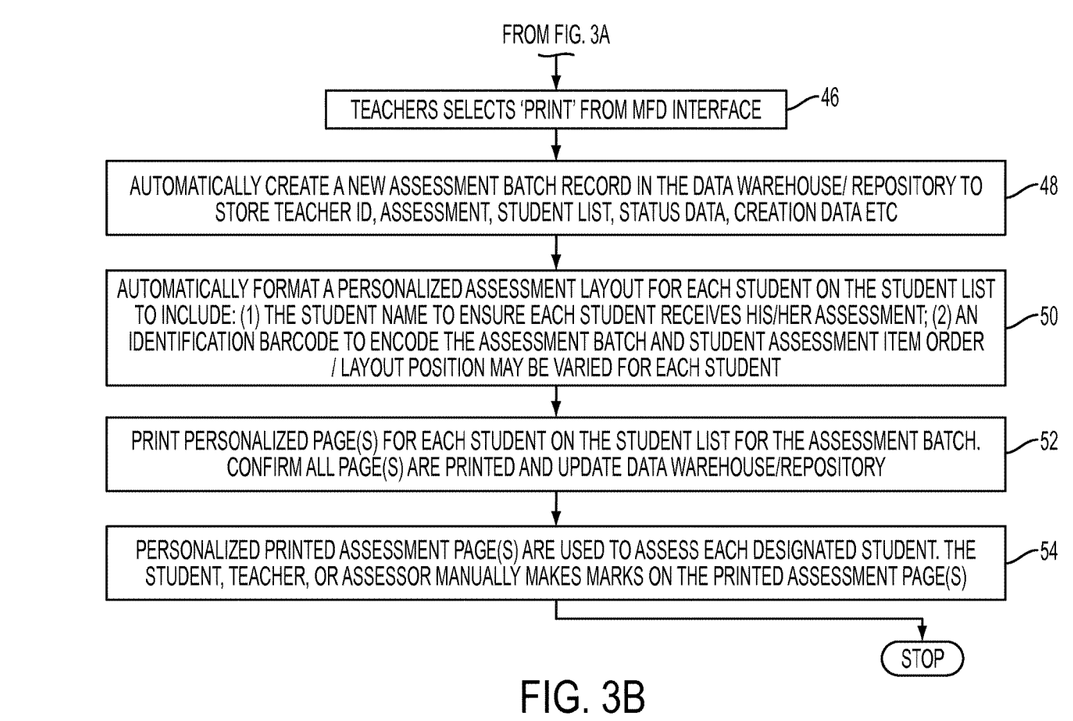

Referring to FIGS. 3A and 3B, the operation of the method of the present disclosure presented in block diagram in which, at step 30 the teacher/educator selects the education assessment service (EAS) print service from the DUI (Digital User Display) of the MFD 12 and proceeds to require the teacher to provide authentication or personal identification information at step 32. At step 34 the system then proceeds to display on the MFD DUI all the pre-defined assessment forms currently associated with the teacher's identification entered in at step 32.

The teacher then chooses at step 36 an assessment form and initiates the formation of an assessment "Batch" associated with that teacher and the selected assessment form. It will be understood, that once initiated, the "Assessment Batch" comprises the basic evaluation unit or cell that the teacher has requested. The teacher then proceeds at step 38 to input a class to assess such as, for example, a seventh grade class, a seventh grade math class, a fifth grade English writing class, or a fourth grade reading class, etc. The system then proceeds to step 40 and enquires as to whether the teacher/educator wishes to select the entire class; and, if the enquiry in step 40 is answered in the affirmative, the system then proceeds to step 42 and includes all students in the class on the Assessment Batch Student List. However, if the query at step 40 is answered in the negative, the system proceeds to step 44 and the class list is displayed on the MFD DUI and the teacher selects specific students to be included on the Assessment Batch Student List.

From step 42 or step 44 the system then proceeds to step 46 and the teacher is prompted to select print from the MFD DUI. The system then proceeds to step 48 and automatically creates a new Assessment Batch record in the Data Warehouse/Repository to store the teacher's identification, the particular assessment form, the Student List, the status data, the date created, and other data which may be required by the particular school administrator/system.

The system then proceeds to step 50 and automatically formats a personalized assessment layout for each student on the Student List, which layout includes the student name to insure each student receives the correct assessment and an identification bar code to encode the Assessment Batch and the student. The assessment item order/layout for each student may be varied for each student to discourage students from looking at neighboring students' assessments for hints. The system then proceeds to step 52, prints the personalized page(s) for each student on the Student List for the Assessment Batch. The system then confirms that all page(s) are printed and updates the Data Warehouse/Repository.

At step 54, the teacher/educator takes the personalized printed assessment page(s) and administers the assessment to each designated student. The teacher/assessor or student, as the case may be, manually marks on the printed assessment page(s) the appropriate response to the challenge indicated on the particular assessment page. Upon completion of marking of the assessments, the marked assessment pages are collected by the teacher/educator for subsequent evaluation.

For an assessment creator/evaluator system, the use of metadata is crucial for the functions of data tracking, reporting, and the customization of learning for the students as well for assisting teachers in their daily practice. The type of metadata to track ranges from the global level to the question level. For example, items being tracked on a global level may include:

(A) Global Level:

1. Assessment Name
2. Description
3. Level-(Grade)
4. Subject
5. Standards
6. Skills The metadata being tracked on the question level may include:

(B) Question Level:

1. Question Type-(Multiple Choice, Rubric, Constructed Response, Fill in the Box, N of M, Bubble sheet, and future types (allowing for growth of invention)
2. Question Number
3. Points (worth)
4. Description
5. Standards
6. Skills This data is stored in the system and aligned with the assessment that was scanned in. The assessment creator/evaluator system assigns additional data for filing and sorting of the assessment such as:

(C) Filing and Sorting Data Assigned

Assessment Name (A1)

Version number (auto generated as 1.0 for first install, successively increases as same assessment is scanned again with same name)

Created By (from user ID)

Grade (A3)

CCSS code (A5)

Description (A2)

Subject (A4)

Figure 5:
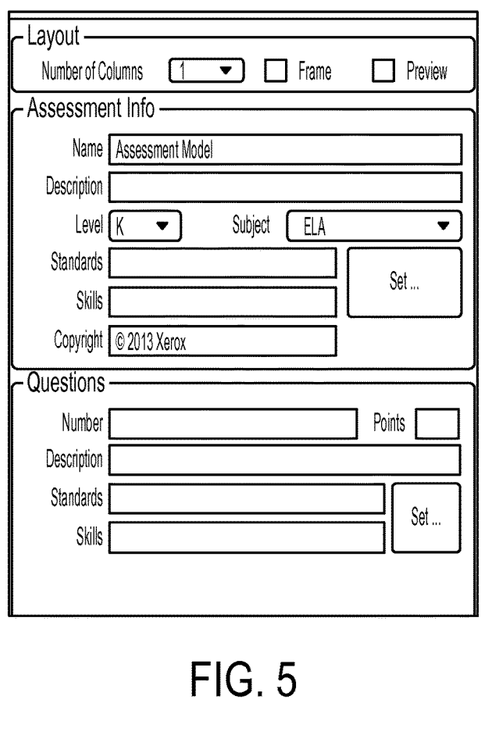
FIG. 5 is a GUI (Graphical User Interface) configured for a user to assign and/or view Global Assessment metadata fields according to an exemplary embodiment of this disclosure.
Figure 6:
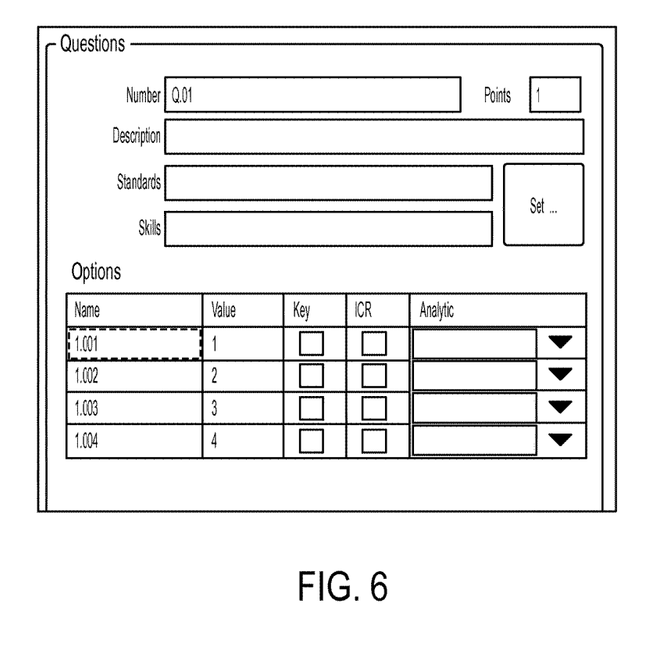
FIG. 6 is a GUI configured for a user to assign and/or view Question Level Assessment metadata fields according to an exemplary embodiment of this disclosure.

The example metadata fields shown in FIGS. 5 and 6 currently are completed manually. The disclosed method and system provided herein completes the fields automatically or semi-automatically. For semi-automatic completion, the list of potential metadata field entries is narrowed to a few that can then be manually selected, for the case where the most probable metadata field is not correct.

According to an exemplary embodiment, an assessment system includes:

- A Multi-Function Device (MFD) that is scan enabled and includes the ability to scan to an assessment system such as the Ignite Educator Support System
- A User Interface Tool including a portal embedded within Ignite that provides for manipulation of an electronic document to create "cells or layers" associated with a scanned preexisting assessment and adding metadata fields.
- Ignite Educator Support System account
- User permissions or roles that allow for Assessment Administration, Assessment Management, and Assessment Creation
- An assessment that contains black and white type or an image
- Descriptions of the Image Capture Process:

Using the Interface Tool a user can capture an image by taking a screen shot of a desired area of the preexisting document. The screen shot is automatically assigned a name such as "layer 1," and is assigned to the original document. Each "layer" will then have metadata assigned to it. The assignment of metadata may occur by OCR (Optical Character Recognition) which auto populates the fields, auto picking data, or entering data manually.

The OCR process can use feature extraction involving a typical pre-processing technique that includes:

- Line and Word Detection
- Layout Analysis (zoning)
- De-Skewing (align)
- Despeckling (smooth edges)
- Possibly Binarization (convert to black and white)
- Normalization of aspect ratio and scale Post processing includes constraints to keep words together and manual entry of metadata includes typing the information, i.e., metadata, into the specified fields for each "layer."

Figure 4:
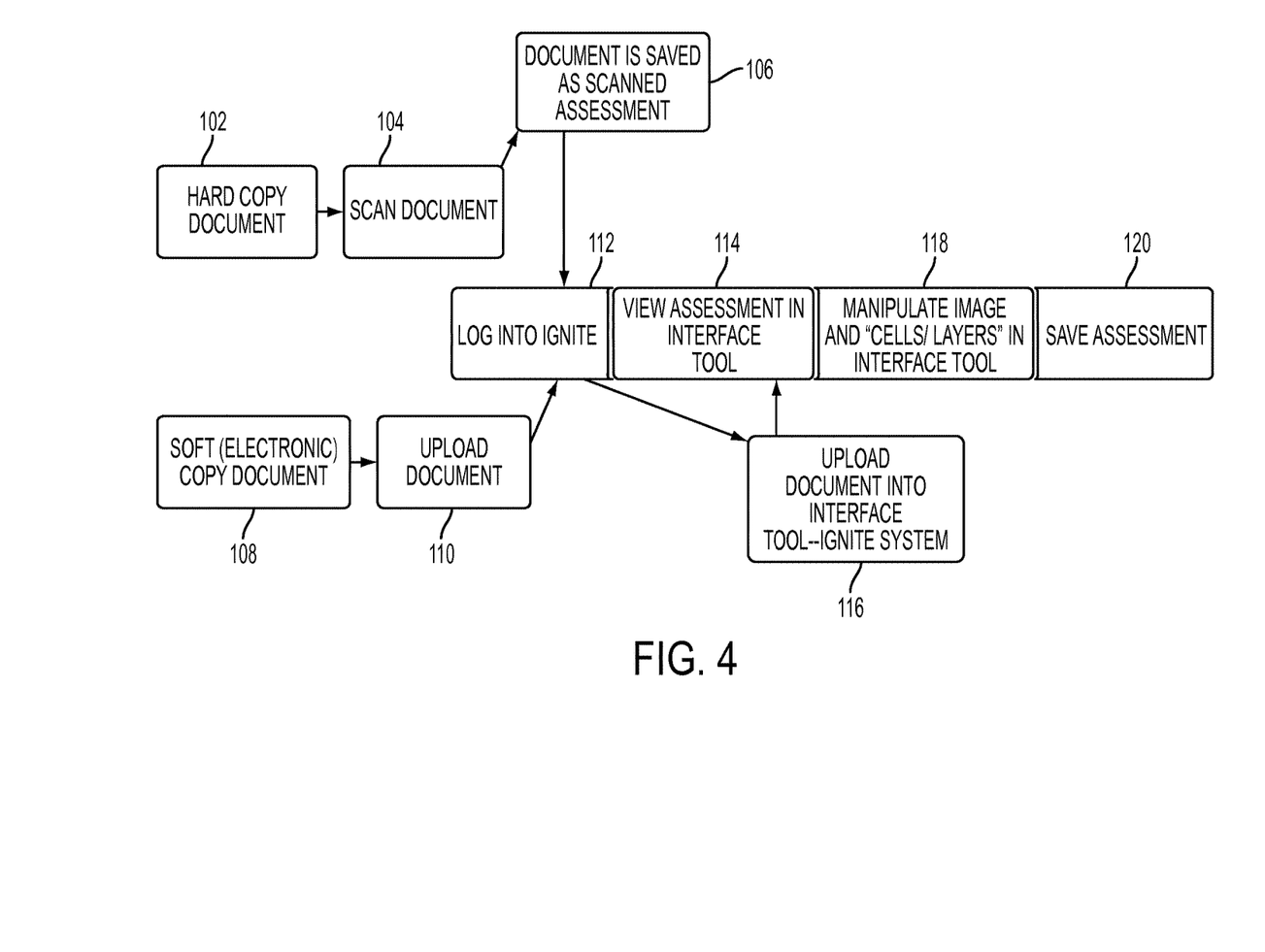
FIG. 4 is a block diagram of a method to process hard and soft copies of a preexisting assessment according to an exemplary embodiment of this disclosure.

Referring to FIG. 4, the work practice steps for a user who has a printed hard copy 102 document involve:

1. Scanning the assessment into the MFD 104.
2. Allowing the system to process the document into the main Ignite Portal and assign a name as Scanned Assessment, stamped by date, and time of scan 108.
3. Logging into Ignite 112, and viewing a document entitled Scanned Assessment 116 after uploading scanned assessment 116.
4. Clicking on the Assessment which opens in the Create tab, to access the Interface Tool 114.
5. Manipulating the image by creating metadata cells or layers as desired 118.
6. Having the option to save the image as is or entering the metadata into the cells or layers that were just created 120.
7. After saving the assessment, it is moved to the Manage database, accessible through Manage Assessments tab in Ignite where the assessment can be accessed through the Edit and Publish tab.
8. The assessment is then ready to be edited and or published
9. Once the assessment has been published it is ready for use The work practice steps for a user who has a soft copy document 108 include:

1. Saving the soft copy document on a local drive 110.
2. Logging into Ignite 112.
3. Uploading the assessment into the Interface Tool 116.
4. The tool assigns a date and time of upload.
5. Clicking on the Assessment which opens in the Create tab, to access the Invention Interface Tool 114.
6. Manipulating the image by creating metadata cells or layers as desired 118.
7. Having the option to save the image as is or entering the metadata into the cells or layers that were just created 120.
8. After saving the assessment, it is moved to the Manage database, accessible through Manage Assessments tab in Ignite, where the assessment can be accessed through the Edit and Publish tab.
9. The assessment is then ready to be edited and or published.
10. Once the assessment has been published it is ready for use.

Various aspects of the method and system are now described in further detail.

Figure 7:
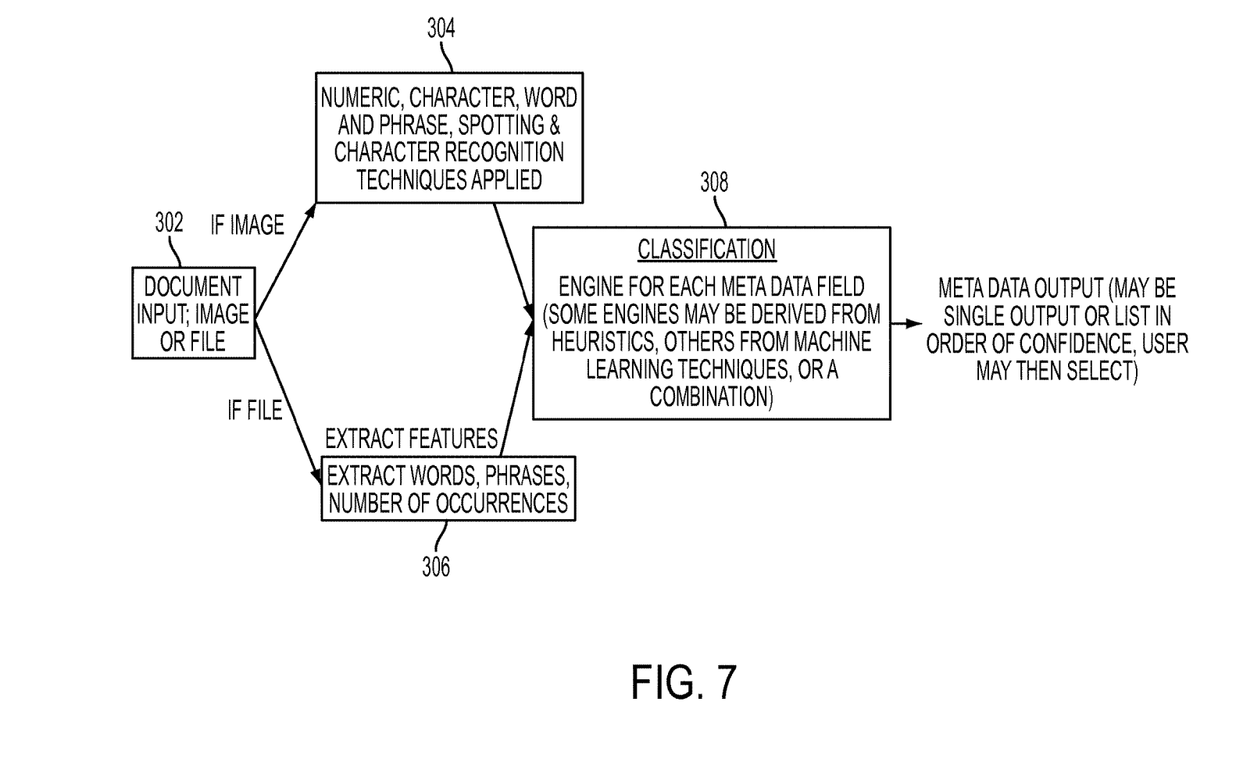
FIG. 7 is a flow diagram of a process to assign metadata field entries to a layer/cell associated with a preexisting assessment according to an exemplary embodiment of this disclosure.

For inputting a preexisting assessment to the assessment creator/evaluator, the procedure involves a number of process steps, as shown in FIG. 7.

1. The preexisting assessment is input into the system by screen shot or electronic image, by the file itself if available, or by hard copy which can be scanned into the system 302.
2. Text location identification, segmentation, and then character classification is then applied. There are existing techniques to accomplish this task and the disclosed process is not constrained to any particular technique. For the case in which the (text) file is available 306 then searching for the presence of key words and phrases is trivial. For cases in which an electronic image is the input 304 then word and numeric and word spotting and identification techniques are applied. See Common Expressions Recognition in Machine Printed and Handwritten Documents, S. Wsha, M. Campanelli. This method can be assisted by object detectors such as box, circle, and line detectors.

An intelligent character recognition module that may be utilized after the character spotting algorithm completes.

3. Key words and phrases are searched so as to identify their presence, or not, and if present then in what frequencies they occur.
4. Following step 3 in which numbers, characters, key words and phrases are collected, one of two methods can be used in which metadata is applied to automatically or semi-automatically complete the metadata fields 308.

Approach 1. Apply a set of manually constructed heuristics. For example; is there a large number of occurrences of characters such as "+", "−", "x", etc . . . If so then this is likely a math assessment. If "+" are identified only then the assessment likely evaluates addition. Are the numbers in the vicinities of the "+" in the range of 0-9, 10-100, >100, etc . . . if so then one can likely determine the correctness of such statements as "this assessment addresses common core requirement x.x" in which students are to be proficient in addition for numbers in the range of 0 to 9. One can also apply name search on the assessment against a list and assign the assessment the name found. Between questions are there multiple occurrences of boxes or other shapes that would suggest a multiple choice question? If so identify it as such. How many questions, occurrences of isolated capitol "Q"'s occur? As can be seen there are potentially many heuristics. The approach requires skill in formulating tests to automatically change scanned content into metadata. It may work well for certain types of assessments, but relies on skillful determination in generating the rule set. To overcome this shortfall, provided is approach 2 described below.

Approach 2. The second approach relies on text classification machine learning techniques in which the features and rules that are important are learned from an existing set of data that provides a supervised training set. Most of the metadata fields are classifications in which there are a limited number of classification categories. Each metadata field is considered a separate machine learning problem, which is now described by example. Initially, a large set of assessments (either as text files or images) is obtained which have been classified as to which skill they address. In lieu of skill, considered also is standard, grade level, description, question type, etc. The task is then that of constructing a classification engine for each metadata field. The most likely classification then populates the field, and other potential classifications are ordered by likelihood and can be selected manually by a pull down menu. In this way, the process of completing the metadata fields is semi-automated, that is the metadata fields are completed to some level of accuracy, but may require a user to validate the results.

In summary, the document information processing method and system disclosed will permit educators to utilize pre-existing "legacy" documents that they have already created in other sources by printing and scanning the document; determine questions and answers on an assessment; analyze a text string to determine metadata on a global document level as well as on a question level using Incremental Parser technology as disclosed in U.S. Pat. No. 7,058,567, issued Jun. 6, 2006, entitled NATURAL LANGUAGE PARSER; collect metadata from analyzed text strings and auto populate the metadata to corresponding metadata fields as required for analysis in the Ignite System; and align with an Automatic Educational Assessment Service as disclosed in U.S. Patent Publication No. 2010/0075290, published Mar. 25, 2010, by DeYoung et al., and entitled "AUTOMATIC EDUCATIONAL ASSESSMENT SERVICE", to validate/grade and create reports with completed assessments.

Figure 8:
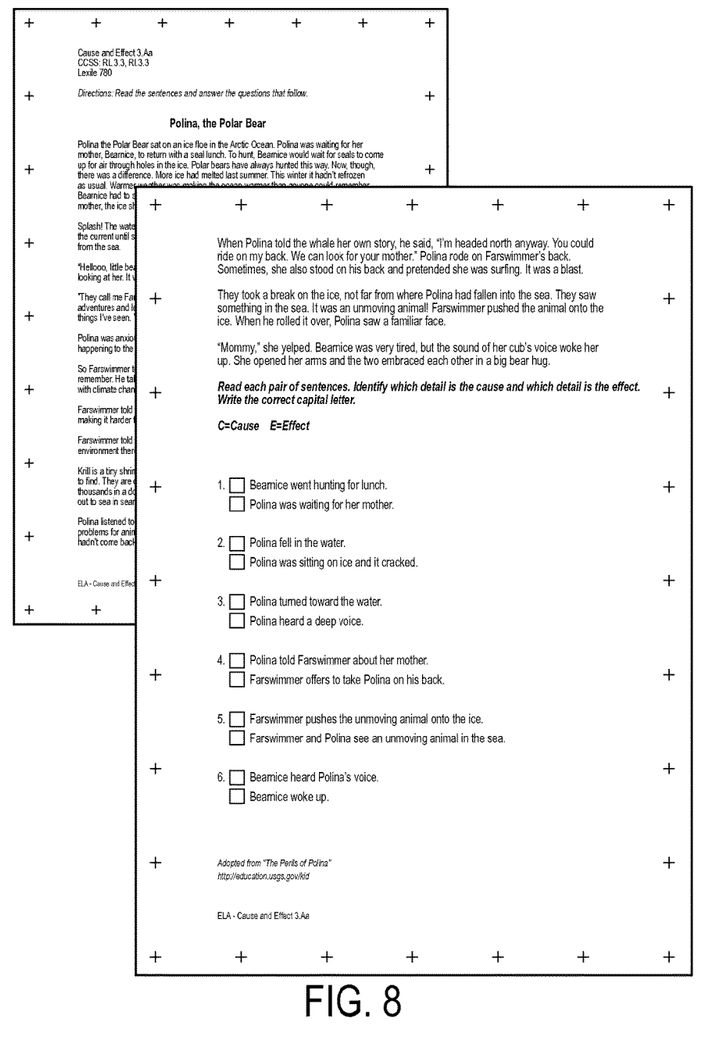
FIG. 8 is an example of a preexisting assessment.

FIG. 8 is an example of a preexisting assessment.

FIG. 9 is an example of a first image area of the preexisting assessment illustrated in FIG. 8 captured via a screen shot, along with metadata completed fields, according to an exemplary embodiment of this disclosure.

FIG. 10 is an example of a second image area of the preexisting assessment illustrated in FIG. 8 captured via a screen shot along with metadata completed fields, according to an exemplary embodiment of this disclosure.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of creating an assessment using an educational assessment analysis system including one or more questions to be answered by a student, the method comprising:
   a) the educational assessment analysis system acquiring a first digital representation of a preexisting assessment not created with the educational assessment analysis system;
   b) the educational assessment system capturing a first area of the first digital representation of the preexisting assessment, the first area selected by a user of the educational assessment analysis system and the first area including text associated with a question to be answered by a student;
   c) the educational assessment system assigning metadata to the first area, the metadata including a plurality of one or more predefined user selectable metadata field entries associated with the first area and the plurality of predefined user selectable metadata field entries including metadata field entries generated by a plurality of trained metadata field type classifiers and a plurality of metadata classification category classifiers for each field type classification, each metadata classifier trained using a training set associated with assessments generated by an independent assessment creation process and each metadata field type classifier classifying the first area text as being associated with a single metadata field type and each metadata classification category classifier further classifying the first area text as being associated with two or more classification categories ordered by likelihood and associated with the single metadata field type, and the plurality of predefined user selectable metadata field entries defined by the associated independent document creation process configured to generate assessments based on one of a plurality of predefined assessment models and based on the user inputting the plurality of one or more predefined selectable metadata field entries;
   d) the educational assessment system displaying each metadata field populated with a most likely classification category of the ordered classification categories from the metadata classification category classifiers and displaying a user selectable menu listing in order of likelihood other classification categories of the ordered classification categories from the metadata classification category classifiers selectable by a user; and
   e) the independent assessment creation process generating a second digital representation of the preexisting assessment based on the first area and the user assigned metadata and processable by the educational assessment analysis system to evaluate questions and associated student answers included in the preexisting assessment,
   wherein prior to step e), step a), step b) step c) and step d) are repeated to capture a second area of the first digital representation of the preexisting assessment and assign metadata to the second area, and step d) generates the second digital representation of the preexisting assessment document based on the first area, the first area's assigned metadata, the second area, and the second area's assigned metadata, and,
   wherein the captured first area is associated with one of a distinct first layer and first cell, and the metadata is assigned to one of the first layer and first cell and the captured second area is associated with one of a respective second layer and second cell, and the metadata is assigned to one of the second layer and second cell.

2. The computer-implemented method of creating an assessment according to claim 1, wherein all or part of the metadata is automatically assigned to the first area, step c) comprising:
   c1) extracting one or more of numbers, characters, key words and key phrases from the first area, the numbers, characters, key words and key phrases associated with the one or more predefined selectable metadata fields;
   c2) accessing the plurality of trained metadata classifiers to determine the plurality of predefined selectable metadata field entries associated with the first area, each of the trained metadata classifiers associated with a respective predefined selectable metadata field entry; and
   c3) assigning the determined selectable metadata field entries as metadata associated with the first area.

3. The computer-implemented method of creating an assessment according to claim 2, wherein the plurality of trained metadata classifiers are derived from one or more heuristics applied to the extracted one or more numbers, characters, key words and key phrases from the first area.

4. The computer-implemented method of creating an assessment according to claim 2, wherein the plurality of trained metadata classifiers are trained using a machine learning process including a supervised training set.

5. A computer program product comprising a non-transitory recording medium storing instructions, which when executed on a computer causes the computer to perform the method for converting a first digital representation of a first form assessment document to a second digital representation of the form assessment document according to claim 1.

* * * * *